Nov. 6, 1934.  A. RIVERA  1,979,903

RECEPTACLE FOR LIQUIDS

Filed Nov. 19, 1932

Inventor
Antonio Rivera.
per
Attorney.

Patented Nov. 6, 1934

1,979,903

UNITED STATES PATENT OFFICE 1,979,903

RECEPTACLE FOR LIQUIDS

Antonio Rivera, Mexico, D. F., Mexico

Application November 19, 1932, Serial No. 643,516
In Mexico September 21, 1932

3 Claims. (Cl. 220—9)

This invention relates to receptacles for liquids and more specifically to certain containers or receptacles specially used for packing liquids, such receptacles being of a special structure so that the liquid contained therein may be preserved for a long period of time at the same degree of temperature which it had when deposited into the receptacle. Said structure is provided with insulating means to prevent the walls forming the receptacle where the liquid is contained from having a direct contact with the atmosphere. These containers or receptacles are mainly used for transporting or depositing liquids the preservation and consumption of which requires their being at a low degree of temperature, such as in the case of beers, milk, etc.

The outstanding features of this invention are clearly set forth in the following specification and have been illustrated in the annexed drawing which forms a part of this application, wherein the same characters of reference are used to indicate the same parts in the various figures shown therein.

Figure 1:
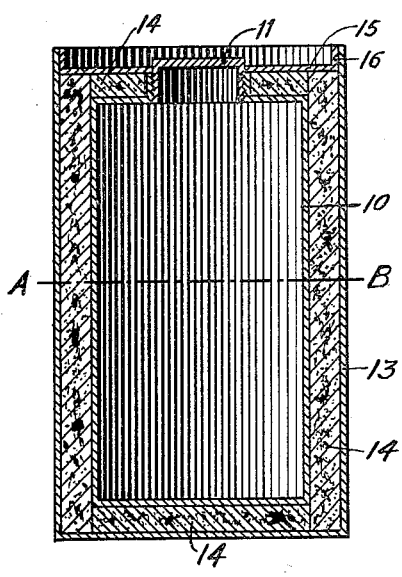
Fig. 1 is a view in vertical sectional elevation of the receptacle, showing the whole structure embodying my invention.

As illustrated in the drawing the receptacle comprises an interior container 10 of cylindrical shape or having any other configuration which is made of metallic material, preferably aluminum sheet, it is provided at its upper end with a screw threaded opening for receiving the cap 11; the cap 11 has the notches 12 to facilitate its removal from the receptacle by means of a wrench or any other suitable tool. Encasing the receptacle 10 and concentric therewith an outside covering 13 has been provided which may be of any suitable material, for instance sheet metal, aluminum, wood, cardboard, etc. This covering actually constituting an outside container which surrounds the interior receptacle 10 on all sides and base. Between the two receptacles there remains a clear space which is filled with compressed cork 14 or with any other class of material having insulating properties; in this manner, the interior container 10 is completely coated on the outside with said insulating material 14, as shown in Fig. 1. The only portion left uncoated is that where the cap 11 is applied and through this mouth or opening the receptacle is filled.

Figure 3:
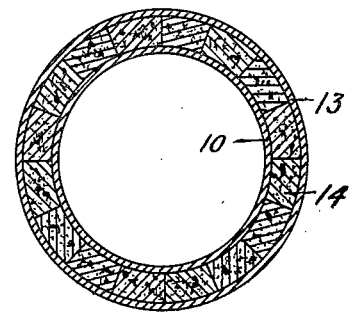
Fig. 3 is a horizontal cut view taken on line A—B of Fig. 1.
Figure 2:
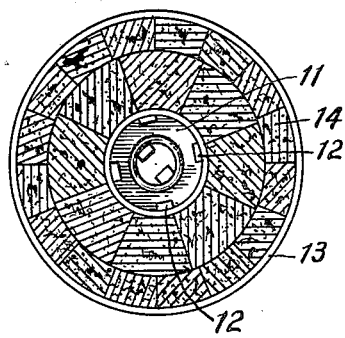
Fig. 2 is a top plan view of the receptacle, taken from its upper portion, with the top removed, which shows the arrangement of the cork insulating material.
Figure 4:
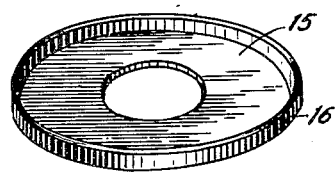
Fig. 4 is a perspective view of the top or cover for the receptacle.

This coating 14 of either cork or any other class of suitable insulating material may be made of a plurality of sheets or strips of convenient thickness firmly attached or stuck together as shown in Fig. 3 thereby forming a cylinder which fills up the clear space between the receptacle 10 and the exterior container 13 or in other words the periphery of the interior receptacle is completely insulated. The base and the upper end of the interior container will also have a coating of either cork or any suitable insulating material arranged in the form of discs made in sections or in one single piece, as shown in Fig. 2, leaving the screw cap 11 free and uncovered. The top 15 (Fig. 4) is applied on the upper insulating material coating 14, and is provided with a circumferential flange 16 which mounts on and is soldered or otherwise attached permanently to the upper edge of covering 13. In this manner the insulating material 14 is tightly covered as well as the outside container 13 in its upper end. The top or cover 15 has a central free or uncovered opening where the cap 11 is applied.

Having thus described my invention and in what manner it can be carried into practice, what I consider as new and desire to secure by Letters Patent is:

1. A liquid container comprising an inner metallic receptacle formed in its top with a flanged opening and otherwise completely closed, an outer receptacle corresponding to the shape of the inner receptacle and spaced from the latter, the outer receptacle extending above the top edge of the inner receptacle, vertically disposed strips of heat insulating material attached to each other and fastened to the outer wall of the inner receptacle and interposed in the space between the inner and outer receptacles, a layer of heat insulating material interposed in the space between the bottoms of the receptacles, a layer of heat insulating material interposed between the flange surrounding the opening and the vertically disposed strips of heat insulating material, and a top plate fitted over the top layer of heat insulating material and the top edges of the vertically disposed strips, said plate having an edge flange secured to the inner wall of the outer receptacle.

2. A container for liquid as described in claim 1, wherein the top and bottom layers of heat insulating material are formed in sections secured together at their meeting edges.

3. A liquid container comprising an inner metallic receptacle formed in its top with an opening surrounded by a flange, vertically disposed strips of cork surrounding the outer side walls of the metallic receptacle and extending above the top and below the bottom of same, the meeting edges of the strips of cork being fastened together, a layer of cork at the bottom of the metallic receptacle, said layer of cork being made up of sections secured together at the edges and fastened to the bottom of the receptacle, the edges of said sections being fastened to the strips of cork extended below the bottom of the receptacle, a layer of cork on top of the receptacle between the upper extended ends of the strips and the flange surrounding the opening, said top layer of cork being made up in sections, the adjacent edges of which are secured together and the outer edges secured to the extended upper ends of the strips, a plate fitted over the top layer of cork and the upper edges of the strip, and an outer casing surrounding the vertically disposed strips and the bottom layer of cork.

ANTONIO RIVERA.